United States Patent
Hegadi et al.

(10) Patent No.: US 12,197,312 B2
(45) Date of Patent: Jan. 14, 2025

(54) CONTINUOUS TESTING FOR DISTRIBUTED SYSTEM TO CONTROL BREAKING CHANGE

(71) Applicant: Visa International Service Association, San Francisco, CA (US)

(72) Inventors: Vivek Gangadhar Hegadi, Bengaluru (IN); Sudipto Nandan, Bengaluru (IN); Sreejith AchazhiyathKalathil, Bengaluru (IN); Arullroja Arumugam, Tiruppur (IN)

(73) Assignee: Visa International Service Association, San Francisco, CA (US)

( * ) Notice: Subject to any disclaimer, the term of this patent is extended or adjusted under 35 U.S.C. 154(b) by 108 days.

(21) Appl. No.: 17/947,683

(22) Filed: Sep. 19, 2022

(65) Prior Publication Data

US 2024/0095149 A1 Mar. 21, 2024

(51) Int. Cl.
*G06F 11/36* (2006.01)

(52) U.S. Cl.
CPC ...... *G06F 11/3664* (2013.01); *G06F 11/3688* (2013.01)

(58) Field of Classification Search
None
See application file for complete search history.

(56) References Cited

U.S. PATENT DOCUMENTS

| | | | | |
|---|---|---|---|---|
| 10,310,968 B2 * | 6/2019 | Biddle | ............ | G06F 11/3668 |
| 11,093,374 B2 * | 8/2021 | Eizenman | ............ | G06F 11/3604 |
| 11,775,907 B1 * | 10/2023 | Recck | ............ | G06Q 10/067 |
| | | | | 714/2 |
| 11,853,196 B1 * | 12/2023 | Pandurangarao | ... | G06F 11/3688 |
| 2005/0261923 A1 * | 11/2005 | Brown | ............ | G06Q 10/10 |
| | | | | 709/232 |

(Continued)

FOREIGN PATENT DOCUMENTS

| | | | | |
|---|---|---|---|---|
| CN | 107122218 A | * | 9/2017 | ......... G06F 11/3604 |
| CN | 112328501 A | * | 2/2021 | |

(Continued)

OTHER PUBLICATIONS

Nils et al., "Continuous Software Testing in a Globally Distributed Project", 2015 IEEE 10th International Conference on Global Software Engineering, Jul. 13, 2015, 130-134.

*Primary Examiner* — Philip Wang
(74) *Attorney, Agent, or Firm* — Kilpatrick Townsend & Stockton LLP

(57) ABSTRACT

A method is configured to perform a continuous software testing. A processor receives, from a code developer computer, a request to commit a code portion for a microservice to a code repository including a source code for a plurality of microservices. The processor executes, using the source code into which the code portion is incorporated, a test transaction routine including tests respectively associated with the plurality of microservices. The processor determines if one or more errors occurred in response to the executing the test transaction routine. If no errors occurred, the code portion is committed to the code repository, and, if one or more errors occurred, a notification is sent to the code developer computer regarding the one or more errors without committing the code portion to the code repository.

18 Claims, 6 Drawing Sheets

(56) References Cited

U.S. PATENT DOCUMENTS

| | | | | |
|---|---|---|---|---|
| 2015/0095619 | A1* | 4/2015 | Dubey | G06F 11/3688 |
| | | | | 712/216 |
| 2015/0262310 | A1* | 9/2015 | Howe | G06Q 20/40 |
| | | | | 705/30 |
| 2018/0260312 | A1* | 9/2018 | Strachan | G06F 8/71 |
| 2018/0267884 | A1* | 9/2018 | Dhanda | G06F 11/3688 |
| 2018/0357154 | A1* | 12/2018 | Dolby | G06F 11/3664 |
| 2019/0121673 | A1* | 4/2019 | Gold | G06F 16/245 |
| 2019/0324897 | A1* | 10/2019 | Subramanian | G06F 11/3664 |
| 2020/0201625 | A1* | 6/2020 | Kryzhanovsky | G06F 8/30 |
| 2020/0233403 | A1* | 7/2020 | Gelbke | G06F 8/60 |
| 2021/0303442 | A1* | 9/2021 | Chenguttuvan | G06F 11/3684 |
| 2022/0164171 | A1* | 5/2022 | Johnson | G06F 8/77 |
| 2022/0188627 | A1* | 6/2022 | Hicks | G06N 3/063 |
| 2022/0413923 | A1* | 12/2022 | Mukkamala | G06F 9/547 |
| 2023/0054780 | A1* | 2/2023 | Boulineau | G06F 11/263 |
| 2023/0122397 | A1* | 4/2023 | Sathyamoorthy | G06F 11/3692 |
| | | | | 717/130 |
| 2023/0176896 | A1* | 6/2023 | Patodia | G06F 9/466 |
| | | | | 718/101 |
| 2023/0176961 | A1* | 6/2023 | Hong | G06F 11/3688 |
| | | | | 717/124 |
| 2023/0205676 | A1* | 6/2023 | Freeman | G06F 11/368 |
| | | | | 717/124 |
| 2024/0004739 | A1* | 1/2024 | Sawant | G06F 9/547 |

FOREIGN PATENT DOCUMENTS

| | | | | |
|---|---|---|---|---|
| EP | 3887933 | B1 * | 2/2024 | G06F 8/30 |
| JP | 2674520 | B2 * | 9/1994 | |
| JP | H0877038 | A * | 9/1994 | |
| WO | WO-2024049455 | A1 * | 3/2024 | |

* cited by examiner

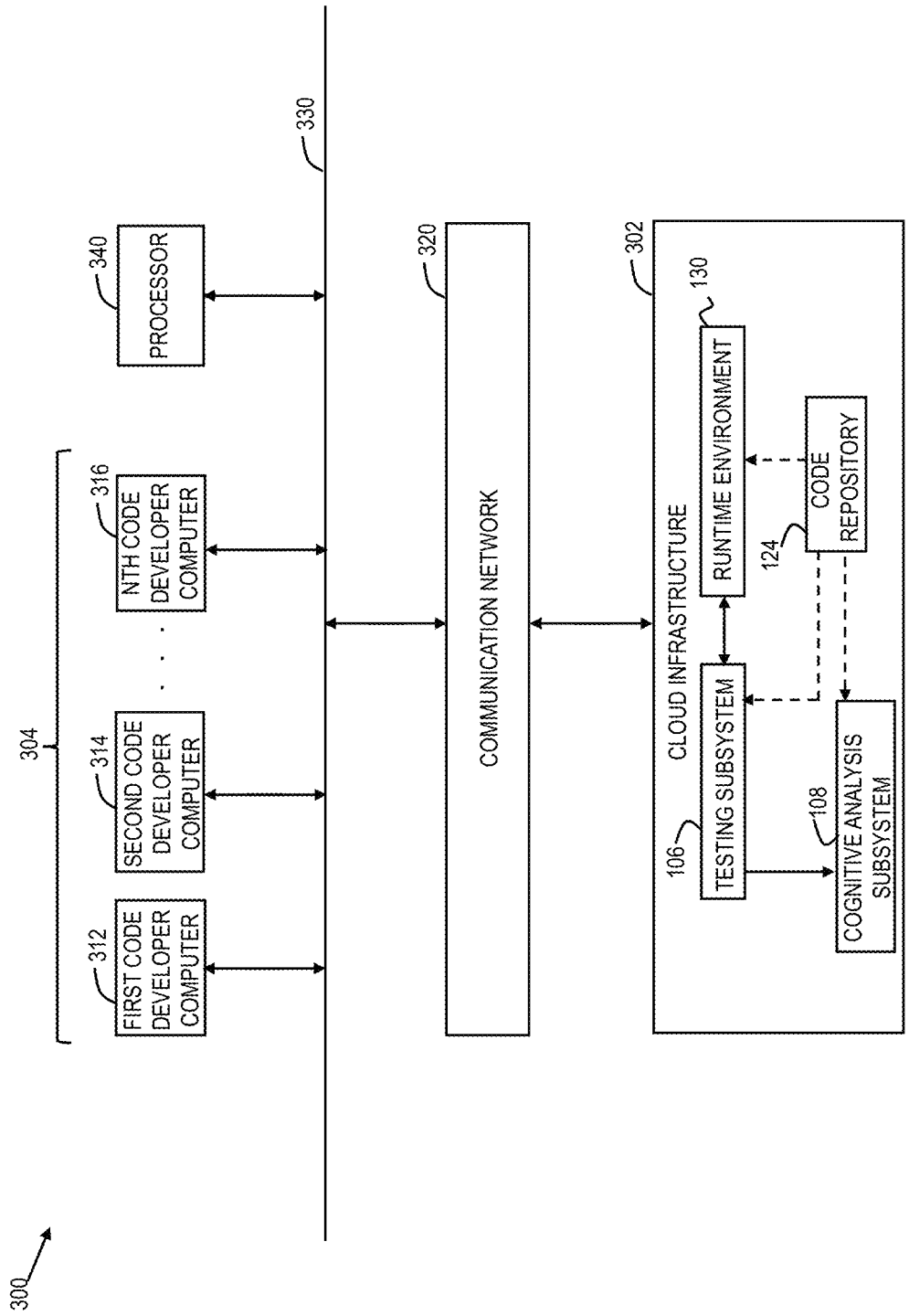

CONTINUOUS TESTING FOR DISTRIBUTED SYSTEM TO CONTROL BREAKING CHANGE

BACKGROUND

Integration testing is a process by which multiple elements in a system can be tested to determine if those elements function together appropriately. As an example, in a system of computers, an integration test may be used to determine if the computers can communicate and collectively perform the functions of the system. Likewise, in a system including a plurality of microservices, an integration test may be used to determine if the microservices could communicate with each other and could collectively perform the required function.

In a microservice architecture, software applications are structured as collections of coupled microservices. Microservice architecture takes advantage of the fact that applications are simpler to build and maintain when broken down into smaller pieces that work seamlessly together. As such, in contrast to the more traditional monolithic application architectures, the microservice architecture is an architectural style that structures an application as a collection of smaller, more specialized parts, e.g., microservices, each of which communicates with others across common interfaces, such as application programming interfaces (APIs) and representational state transfer (REST) interfaces, e.g., Hypertext Transfer Protocol (HTTP).

The microservices may be defined by their functionalities. For the most part, the microservices may be developed and maintained by the distributed code developers, e.g., code development teams. Recent changes to the way of how the applications are architected, developed, and consumed increase the complexity of testing and the business impact of software failures. Introduction of a new code or a code update might create multiple points of failure on the flow path of the function being executed by the microservices.

Continuous delivery (CD) pipelines are designed to allow software to be automatically built, tested, and deployed with maximum speed and minimum effort. Continuous delivery pipelines have been typically built for a particular use case with each development team creating, testing, and managing their own continuous delivery pipeline.

However, the connections of all of the microservices running an operation or operations of a system need to be validated, prior to deploying the code into the production environment.

Embodiments of the present disclosure address these and other problems, individually and collectively.

SUMMARY

According to an aspect of an embodiment, a method for performing a continuous testing is provided. The method includes receiving, by at least one processor from a code developer computer, a request to commit a code portion for a microservice among a plurality of microservices to a code repository including a source code for the plurality of microservices; executing, by the at least one processor using the source code into which the code portion is incorporated, a test transaction routine including tests respectively associated with the plurality of microservices; determining, by the at least one processor, if one or more errors occurred in response to the executing the test transaction routine; and in response to the determining, performing, by the at least one processor, an action including: if no errors occurred, then committing the code portion to the code repository, or if one or more errors occurred, then sending a notification to the code developer computer regarding the one or more errors without committing the code portion to the code repository.

According to an aspect of an embodiment, a system includes a code repository including a source code for a plurality of microservices; and one or more computer systems, wherein the one or more computer systems are configured to perform a method including: receiving, from a code developer computer, a request to commit, to the code repository, a code portion for a microservice among the plurality of microservices; executing, using the source code into which the code portion is incorporated, a test transaction routine including tests respectively associated with the plurality of microservices; determining if one or more errors occurred in response to the executing the test transaction routine; and in response to the determining, performing an action including: if no errors occurred, then committing the code portion to the code repository, or if one or more errors occurred, then sending a notification to the code developer computer regarding the one or more errors without committing the code portion to the code repository.

BRIEF DESCRIPTION OF THE DRAWINGS

The above and/or other aspects, features and advantages of certain embodiments will be more apparent from the following detailed description, taken in conjunction with the accompanying drawings, in which:

FIG. 3 depicts a computing environment according to an embodiment.

DETAILED DESCRIPTION

Figure 1A:
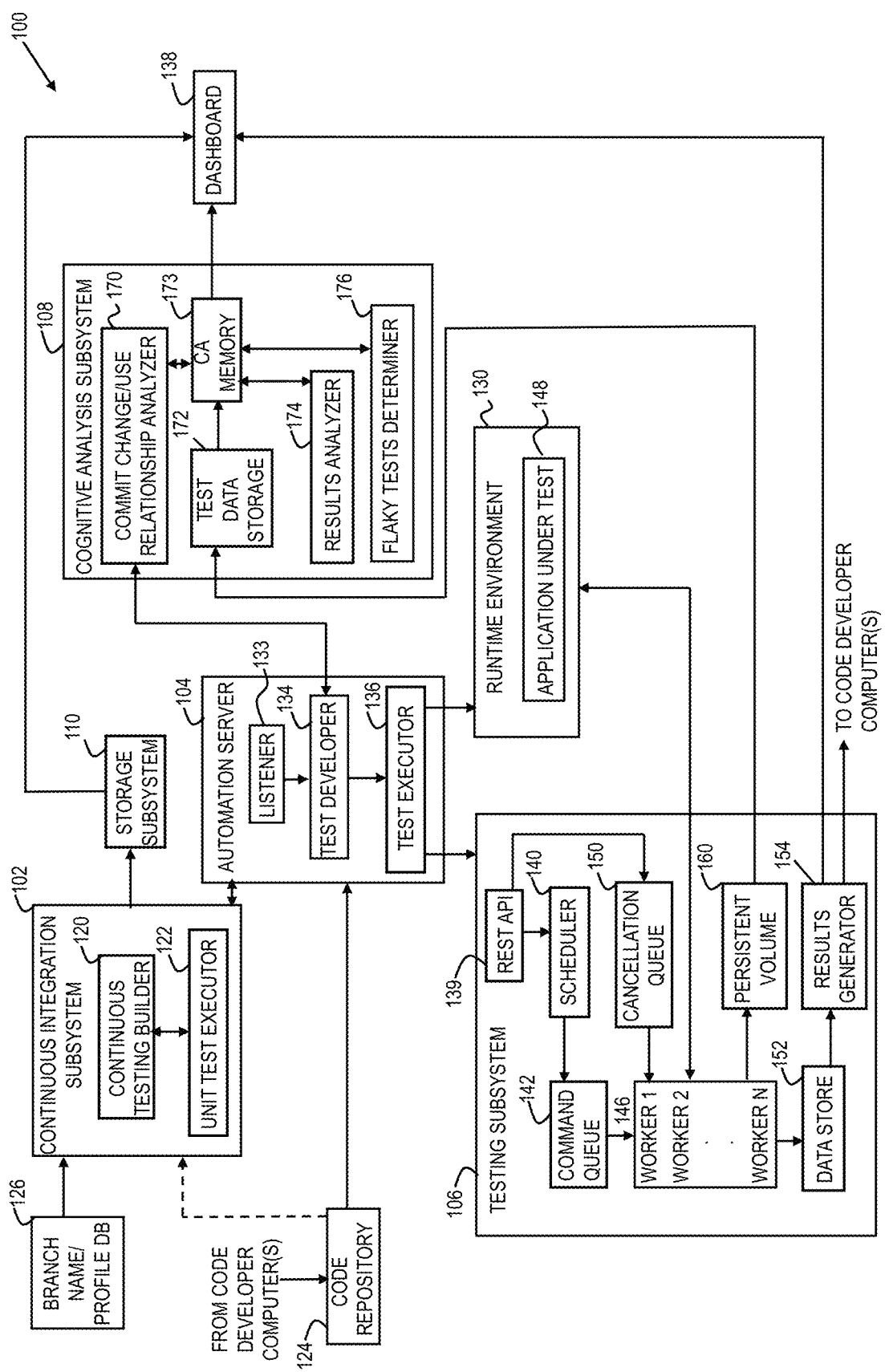
FIG. 1A depicts a testing system according to an embodiment.

According to embodiments, continuous testing of the system may test, for example, end to end (E2E) transactions in continuous integration pipeline for providing earlier and more comprehensive feedback with correct data point on every single request to commit a code portion, prior to allowing this code portion to be merged. In such E2E testing, all of the applicable microservices of the system can be fully tested to determine if the data can be successfully routed through the entire system, prior to any piece of code being merged.

Getting such feedback early in the lifecycle of the software prevents breaking changes by not deploying the erroneous code into the environments. This also saves time from the delivery pipeline standpoint and enables the distributed teams to be more agile and deliver functionally working shippable code to the production faster and more efficiently. As a result, the efficiency and functioning of the computer systems are also improved.

As mentioned in the Background section, the past few years have brought a great amount of change in the way how the applications are architected, developed, and consumed—increasing both the complexity of testing and the business impact of software failures. More and more, the developers rely on the distributed systems or microservices where codebase is complex with multiple services and each of these services consuming multiple libraries from multiple resources.

Considering there is not one system that to be tested but a smaller individual pieces which are distributed, and there are not one single point of failure, but multiple points of failure are possible, the testing is required to ensure that all of the smaller pieces are holding up and provide the functionality that a monolith component would do.

It is imperative to have a reliable testing to find failures by considering multiple points of failures in the distributed system and/or the system which relies on the microservices to process use cases.

In embodiments, a pre-merge commit test is utilized as a gate to check for errors (e.g., regressions) through CT which uncovers the issues early in the process before the code change is merged, thereby preventing a breaking change.

Once the pre-merge test is completed, the pipeline sends email notification(s) to the code owner and/or also provides the results of the testing to the designated teams or individuals. The merge of the code is allowed only when the test results of the generated test suite are clean (with only known failures, or no new issues).

Based on the resource/capacity available, the pre-merge test can be configured to be executed for every commit request to commit the code, or, periodically, to include all commit requests raised within the predetermined time period for feature, develop, release, and/or master branch. As used herein, a commit request or a request to commit the code is an operation by which the latest changes to the code are submitted to the repository.

For example, when the request to commit the code is raised, the testing pipeline builds and/or updates the service with the changes, deploys the service and triggers functional and/or non-functional test(s) executions, e.g., a smoke test, a short regressions (SRG) test, and/or large regressions (LRG) test, that cover predetermined use cases within a plurality of microservices. In some embodiments, the environment used for testing may be a long-lived environment. In some embodiments, the environment used for testing may be a temporary environment, e.g., a sandbox, that is provisioned for the particular test execution based on the branch.

In an embodiment, all transactions are run on a system level use case to validate the complete technology stack (Tech-Stack), and not on one microservice as in the related art. For example, the objective of the overall Tech-Stack may be to authorize a transaction and it is divided into smaller pieces. The breaking changes in the system may be identified by running a system test which includes running a financial transaction across Tech-Stack in the CI pipeline, before the code is deployed into the production.

The transactions may be run on the pseudo code, and a validation is performed to evaluate a breaking change or changes in the system. If the breaking change is identified, the microservices owner is notified that there is a breaking change, and that the changes that have been introduced in the latest commit request will not be merged.

In embodiments, the multiple microservices are built and deployed into the temporary run environment and their connections are validated, prior to the new code being merged. For example, the source code is compiled to incorporate the code portion, for which the commit request is received, and a binary is generated. The binary may be stored in a common centralized cloud location. An exemplary testing system deploys the binary in the temporary runtime environment where it can provide the functionality and the certain transactions can be simulated to validate the use cases for the complete Tech-Stack.

In embodiments, the breaking changes in the system may be identified by running the system test, e.g., running one or more financial transactions across entire Tech-Stack, before the production build is generated and deployed. One or more of points of failure in one or more microservices may be identified at the points where they are introduced, and the respective owners of the microservices may be correspondingly notified.

In embodiments, the CT may identify breaking change that might be introduced due to any of the changes to the use cases. The examples include a code for deploying into environments, a configuration, a runtime environment, data which may be used for validation, and distributed microservices testing toolkits which may validate the microservices. A failure could happen in any of the above-mentioned five layers (e.g., use cases) and the CT can be configured for all of the use cases. However, the described-above is not intended to be limiting, and other use cases, which may arise depending on the customer environment, may be tested before the code is merged into the build intended to be deployed into the production.

Prior to discussing embodiments, some terms used herein are described below.

A "breaking change" is a change in one part of a software system that potentially causes other components to fail. The breaking change occurs most often in shared libraries of code used by multiple applications. In the context of the microservices, a breaking change is a change to one microservice which might cause one or more of other microservices to fail.

A "server computer" may include a powerful computer or cluster of computers. For example, the server computer can be a large mainframe, a minicomputer cluster, or a group of servers functioning as a unit. In one example, the server computer may be a database server coupled to a web server. The server computer may include one or more computational apparatuses and may use any of a variety of computing structures, arrangements, and compilations for servicing the requests from one or more client computers.

A "memory" or a "storage" may be any suitable device or devices that may store electronic data. A suitable memory may include a non-transitory computer readable medium that stores instructions that can be executed by a processor to implement a desired method. Examples of memories may include one or more memory chips, disk drives, etc. Such memories may operate using any suitable electrical, optical, and/or magnetic mode of operation.

A "processor" may refer to any suitable data computation device or devices. A processor may include one or more microprocessors working together to accomplish a desired function. The processor may include a CPU that includes at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "cloud infrastructure" or "cloud computing network" may include a shared pool of configurable computer system resources. A distributed computing network may include a distributed collection of infrastructure, including server computers, memory storage, and networking infrastructure, as well as platform resources such as databases and applications. In a distributed computing network, a number of computer nodes may communicate with one another, in order to provide some service to client computers.

A "computer system" may include an entity in a computer network. A computer system may be a computer, such as a server computer that communicates with client computers in a computer network. A computer system may include a physical computer, virtual machine, or another emulation of a computer system.

A "virtual machine" can be an emulation or abstraction of a computer system. Virtual machines may be based off of computer architectures and provide the functionality of a physical computer. A virtual machine may have its own operating system and may be partially or totally isolated from other virtual machines operating on a (non-virtual) server computer. A host system may use a hypervisor to share and manage hardware (e.g., RAM, magnetic disk drive, etc.) between virtual machines.

A "bare metal" is a physical computer specifically designed to run dedicated services without any interruptions for extended periods.

A "development team" having one or more code developers may be responsible for building, releasing, and integrating a portion of software code into a production build. As used herein, a "commit requester" may be a development team or a member of the development team, e.g., a code developer.

A "code developer computer" may refer to a computer operated by a code developer or to a terminal operated by the development team.

A "binary" or a "binary program image" is the result of the compiling and linking (or assembling and linking) a program. The binary program image may be a file stored to the memory. The binary image is loaded into the memory of the environment when that program is executed, and the operating system knows what to do with this data in the memory.

A "build" may refer to the process of creating an application program for a software release, by taking all the relevant source code files and compiling them and then creating build artifacts, such as binaries or executable program(s), etc. "Build data" may therefore refer to any files or other data associated with a build. The terms "build" and "build data" (or "build file") may also be used interchangeably to commonly refer to a version or other manifestation of an application, or otherwise the code or program associated with an application that can be tested for performance.

Priority 1 ("P1") refers to a complete business down situation or single critical system down with high financial impact.

Priority 2 ("P2") refers to a major component of the client's ability to operate being affected. Some aspects of the business can continue but it is a major problem.

Priority 3 ("P3") refers to a situation when the client's core business is unaffected but the issue is affecting efficient operation by one or more people.

"Smoke testing," also called a verification, is a non-exhaustive software analysis that ascertains that the most crucial functions of a program work.

"Regression testing" is a test which ensures that changes to the codebase (new code, debugging strategies, etc.) do not disrupt the already existing functions or trigger some instability.

"Short regressions" (SRG) test refers to one or more tests for P1 flow, the breaking of which may cause major issues.

"Large regressions" (LRG) test refers to one or more tests for P2 and P3 flows, the breaking of which may cause major issues or minor issues.

A "flaky test" is an analysis of application code that fails to produce the same result each time the same analysis is run. For example, a failing test is a test that fails consistently across multiple reruns, and a flaky test is a test that eventually passes across reruns if the test reruns multiple times.

A "branch" is a copy of a code. Software development teams use branching so that they could work in parallel. It separates "in-progress work" from the tested and stable code.

"DevOps" is a combination of software development (Dev) and information-technology (IT) operations (Ops). DevOps is a set of practices that automates the processes between software development and IT teams that seeks to facilitate building, testing, and releasing of software faster and more reliably. DevOps involves continuous planning, continuous testing (CT), continuous integration (CI), continuous delivery (CD), and other forms of continuous evolution of both the project and the software.

"Jenkins" is an open source CI/CD automation software DevOps tool written in the Java programming language. It is used to implement CI/CD workflows, called pipelines. Pipelines automate testing and reporting on isolated changes in a larger codebase in real time and facilitate the integration of disparate branches of the code into a master branch. They also may rapidly detect defects in a codebase, build the software, automate testing of the builds, prepare the codebase for deployment (delivery), and ultimately deploy code to containers and virtual machines, as well as bare metal and cloud servers.

A "REST API" (also known as RESTful API) is an application programming interface (API or web API) that conforms to the constraints of REST architectural style and allows for interaction with RESTful web services. For example, a REST API may use a GET request to retrieve a record, a POST request to create one, a PUT request to update a record, and a DELETE request to delete one. All HTTP methods can be used in API calls.

Technology stack ("Tech-Stack") refers to an all-in-one platform that handles each step of the processing required by the customer. Each of the steps has a corresponding team, set of processes, and tools.

A "worker" is responsible for polling a task queue, dequeuing a task, executing the code in response to a task, and providing the results of the task execution.

"Entities" may include things with distinct and independent existence. For example, entities may include people, organizations (e.g., partnerships and businesses), computers, and computer networks, among others. An entity can communicate or interact with its environment. Further, an entity can operate, interface, or interact with a computer or computer network during the course of its existence.

A "microservice" may refer to one or more software functions that may be part of a larger software application or may be a standalone software application. A microservice may include a function that returns a value when called from another software function or application. "Microservices" may include services that operates in a loosely coupled manner with a collection of other microservices in order to implement an application. For example, a video streaming server may provide a video streaming service to client computers using a plurality of microservices, wherein one microservice may provide the user interface front end, another microservice may manage a database of videos, a third microservice may manage video encoding, etc. As another example, in a financial institution, microservices may include, without limitation, payments, money transfer generation, wire enrichment, credit/liquidity service, fraud/ anti-money laundering, accounting service, limits management, supplemental income routing service, business rules and reference management, approval service, alerts/email service, reconciliation service (matching), and document generation. Microservices may operate in separate, isolated software containers and may communicate over well-defined channels in order to implement a service, e.g., an image hosting service, transaction authorization service, video streaming service, etc.

"Metadata" may include data that provides information about other data. Types of metadata include descriptive metadata, structural metadata, administrative metadata, reference metadata and statistical metadata. Metadata may correspond to a microservice, microservice image, entities associated with the microservice, request to commit the code or the code portion, commit requester, etc.

A "system call" or a "call" may include a request by a software application for a service. This may include hardware-related services (e.g., reading from the keyboard, accessing a disk drive, etc.), creating and executing new processes, and communicating with cloud services such as test scheduling.

A "command" may include an executable program, e.g., related to a job or a task. A command may be executed from a system shell either directly or indirectly by an entity such as a user. A command may apply an action on input data and generate output data. As an example, a command may be used to generate output data in the form of system or disk files. Commands may have a syntax, such as "verb [options] [arguments]."

A "machine learning (ML) model" may include an application of artificial intelligence (AI) that provides systems with the ability to automatically learn and improve from experience without explicitly being programmed. A machine learning model may include a set of software routines and parameters that can predict an output of a process (e.g., authentication of a computer, a suitable recommendation based on a query, etc.) based on a "feature vector" or other input data. A structure of the software routines (e.g., number of subroutines and the relation between them) and/or the values of the parameters can be determined in a training process, which can use actual results of the process that is being modeled, e.g., the identification of different classes of input data. Examples of machine learning models include support vector machines, models that classify data by establishing a gap or boundary between inputs of different classifications, as well as neural networks, collections of artificial "neurons" that perform functions by activating in response to inputs.

An open VisaNet or OVN is an electronic payment network which manages transaction flows and risk management (e.g., fraud detection), among other services and functions.

A "message" is an electronic communication used in a process of communication between software components or between applications. A messaging system may include a peer-to-peer facility such that a messaging client may send messages to, and receive messages from, any other client. Each messaging client may connect to a messaging agent that provides facilities for creating, sending, receiving, and reading messages. Messaging may enable distributed communication that is loosely coupled, e.g., among microservices.

An "authorization request message" may be an electronic message that is sent to request authorization for a transaction. The authorization request message can be sent to a payment processing network and/or an issuer of a payment card. An authorization request message according to some embodiments may comply with ISO 8583, which is a standard for systems that exchange electronic transaction information associated with a payment made by a user using a payment device or payment account. Other standard message formats may include ISO 20022 as well as blockchain message format. The authorization request message may include information that can be used to identify an account. An authorization request message may also include additional data elements such as one or more of a service code, an expiration date, etc. An authorization request message may also include transaction information, such as any information associated with a current transaction, such as the transaction amount, merchant identifier, merchant location, etc., as well as any other information that may be utilized in determining whether to identify and/or authorize a transaction. For example, one or more microservices may perform a function or functions of verifying the message format and the format of individual pieces of information which are expected to be present in the authorization request message.

An "authorization response message" may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. For example, one or more microservices may perform a function or functions of verifying the message format and the format of individual pieces of information which are expected to be present in the authorization response message.

"Tokenization" is a process by which the data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token).

A "commit" or "a code commit" is an operation which sends the latest changes of the source code to the repository, making these changes part of the revision of the repository. Thus, when other users do an update or a checkout from the repository, they can receive the latest committed version. Such version control systems allow rolling back to previous versions easily.

"BitBucket" is a cloud-based service that helps code developers to store and manage their code, as well as track and control the changes to their code. BitBucket provides a cloud-based Git repository hosting service.

Certain embodiments are described below with reference to the accompanying drawings.

FIG. 1A depicts a testing system 100 according to an embodiment. The testing system 100 provides a continuous testing of the system which may test, for example, E2E transactions in CI pipeline for providing earlier and more comprehensive feedback with correct data point on every single request to commit the code that goes into repository, for example, of how good or bad is the quality of code and from overall project integration and E2E transaction flow point of view. In such E2E testing, all of the applicable microservices of the system can be fully tested to determine if the data (e.g., data related to a financial transaction) can be successfully routed through the entire system employing the microservices.

The testing system 100 utilizes a pre-merge commit test to check for errors, to uncover the issues early in the software development and delivery process and before the code which may cause a potential breaking change is implemented in the build. In the case that an error occurs during the pre-merge test, an error notification may be issued. Otherwise, the code may be permitted to merge, e.g., may be committed to the code repository.

With continuing reference to FIG. 1A, the testing system 100 may be implemented using one or more computer systems, each computer system having one or more processors. The testing system 100 may include multiple components and subsystems communicatively coupled to each other via one or more communication mechanisms.

For example, in an embodiment depicted in FIG. 1A, the testing system 100 may include a continuous integration (CI) subsystem 102, an automation server 104, a testing subsystem 106, and a cognitive analysis (CA) subsystem 108. These subsystems may be implemented as one or more computer systems. The systems, subsystems, and other components depicted in FIG. 1A may be implemented in software (e.g., code, instructions, program) executed by one or more processing units (e.g., processors, cores) of the respective systems, using hardware, or combinations thereof. The software may be stored on a non-transitory storage medium (e.g., on a memory device). The testing system 100 depicted in FIG. 1A is merely an example and is not intended to unduly limit the scope of embodiments. Many variations, alternatives, and modifications are possible. For example, in some implementations, the testing system 100 may have more or fewer subsystems or components than those shown in FIG. 1A, may combine two or more subsystems, or may have a different configuration or arrangement of subsystems.

For example, each of the CI subsystem 102 and the automation server 104 may be implemented as bare metal. However, this is not intended to be limiting, and the CI subsystem 102 and the automation server 104 may be implemented by one bare metal, or in any other suitable manner.

In an embodiment, the CI subsystem 102 receives information on one or more requests to commit one or more code portions, e.g., newly developed code or code portions, and the branch name for which the code is to be tested and/or where the code is to be merged. Based on the resource/capacity available, the pre-merge test can be configured to run for every commit request, or, periodically, to include all commit requests raised within the predetermined time period for feature, develop, release, and/or master branch.

For example, the request to commit the code may be submitted by one of the multiple development teams working in a distributed environment and submitting the code to one or more code repositories. The development teams may be responsible for building, releasing, and integrating software for various applications and/or different components, e.g., microservices. The examples of the microservices may include a fraud detection, a message format detection, tokenization, cryptographic processing, transaction authorization processing, etc. When the commit request is raised, e.g., submitted, the testing pipeline builds and/or updates the service with the changes, deploys the service and triggers functional and/or non-functional test(s) executions, e.g., a smoke test, an SRG test, and/or LRG test, that cover predetermined use cases within a plurality of microservices.

Based on the received information, the CI subsystem 102 builds a continuous testing (CT) environment for a plurality of microservices by compiling an appropriate code. The CT environment may include or otherwise have access to one or more repositories or other data storage elements for storing data related to the test execution, which includes any files, reports, information, results, metadata or other data associated with and/or generated during a test implemented within the CT environment.

As a result of the operations performed by the CI subsystem 102, e.g., a code compilation, a binary image is generated and may be output to the automation server 104. In some embodiments, the data related to the build compiled by the CI subsystem 102 may be stored in a storage subsystem 110 or another storage accessible by the testing system 100.

The compiled binary is configured to run in a temporary runtime environment, e.g., a sandbox, that is created for running a test suite on the build including the newly submitted code, e.g., a code portion, and associated with the plurality of microservices. After the completion of the test suite, the temporary runtime environment may be deleted.

The CI subsystem 102 may include a continuous testing (CT) builder 120 and a unit test executor 122. The CT builder 120 receives a commit request, e.g., a request for merging or committing a code to a code repository, submitted by a code developer via the code developer computer, and information related to the commit request from a code repository 124, e.g., BitBucket. For example, the information related to the commit request may be metadata associated with the commit request that describes, for example, the commit request, the associated code, and/or a commit requester.

The CT builder 120 also receives, from a branch name/profile database (DB) 126, client profile information. For example, the client profile information may include information related to the configuration of the target system for which one or more payment flows or transaction flows are to be simulated, the software branch into which the code associated with the commit request is to be merged, etc.

Figure 1B:
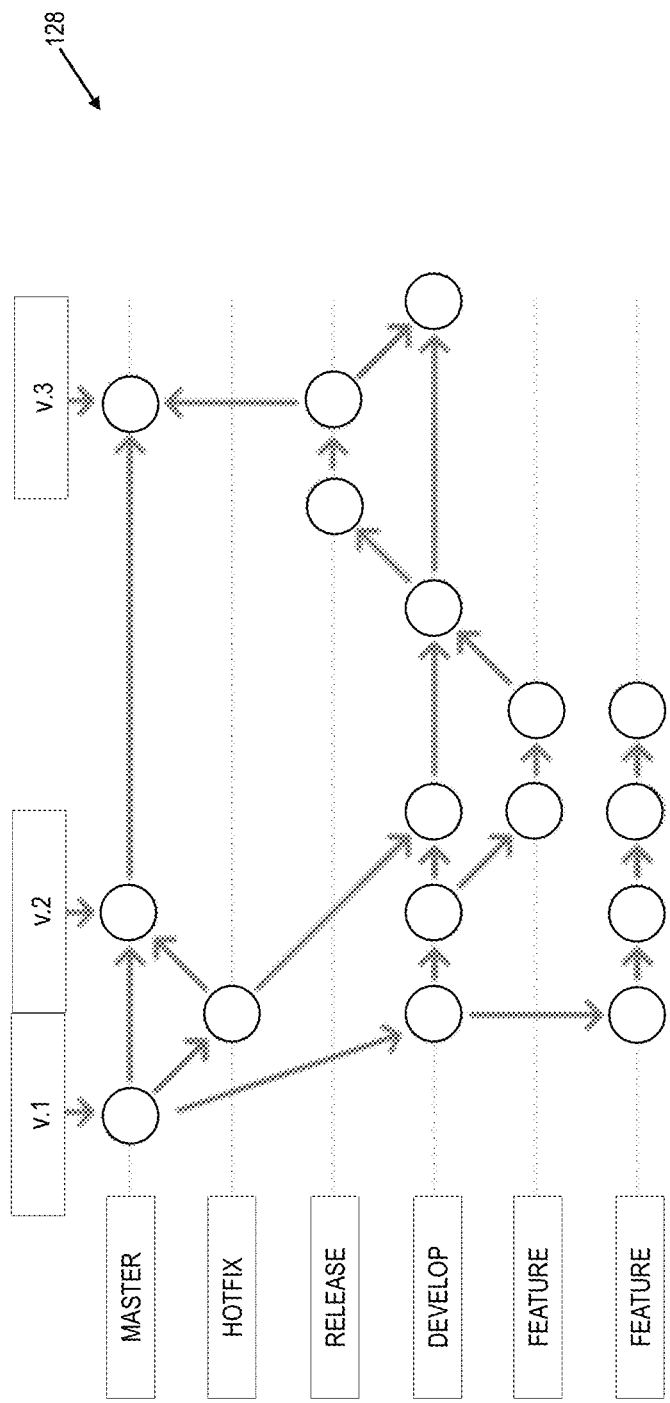
FIG. 1B schematically depicts an example of software branching.

FIG. 1B schematically depicts an example of software branching 128. Examples of the branches include a master branch into which the mature code is placed to be eventually deployed into the production, and a develop branch into which a code at the development stage is placed. A release branch is created from the develop branch. Feature branches are also created from the develop branch. When a feature is complete, it is merged back into the develop branch, e.g., a different version of the develop branch. When the release branch is done, it is merged into the develop and/or the master branch. If an issue in the master branch is detected, a hotfix branch is created from the master branch and the master branch is fixed.

For example, when a code developer commits a code, e.g., raises a commit request, the code may be built to be pushed into one of the branches. When a feature is being developed, the code may be built to be committed to a feature branch. When a feature is stabilized, the code containing the feature may be committed to a develop branch or a master branch.

With reference again to FIG. 1A, the CT builder 120 builds the CT environment based on the metadata of the commit request that is received from the code repository 124, using the details of the software branch which needs to be tested and the configuration information that are received from the branch name/profile DB 126. The CT builder 120 builds the CT environment in cooperation with the unit test executor 122 which, during the building of the CT environment, performs unit testing and enhanced unit testing for each of the microservices, as a validation phase. As a result of the operations performed by the CT builder 120 and the unit test executor 122, the binary image is generated which has a complete test environment derived from the source code into which the new commit is incorporated and which is ready to run E2E financial transaction (or another applicable operation) in the microservices environment.

The automation server 104 may be a Jenkins slave machine, e.g., a virtual machine. The automation server 104, based on the code associated with the commit request and the information related to the commit request, generates one or more test routines, e.g., a test suite, and a test execution environment, for example, a runtime environment 130, e.g., the sandbox, to which the binary image is provided. For example, the test routines include a routine which tests processing for at least one operation of a financial transaction flow. The processing of the financial transaction flow may include sending an authorization request message, validating the transaction, and receiving an authorization response message.

The automation server 104 invokes a request for the testing subsystem 106 to execute the testing routines using the binary image loaded into the runtime environment 130. In some embodiments, after the test suite is completed, the runtime environment is deleted.

The automation server 104 may include a listener 133 which pulls one or more commit requests and associated metadata, e.g., the metadata associated with each instance of the commit request and/or associated code, from the code repository 124. For example, the listener 133 may pull each newly deposited commit request or may pull one or more commit requests periodically, e.g., every 2 hours. In some embodiments, the listener 133 may provide information on the commit request and/or associated code portions to the CI subsystem 102.

The automation server 104 may further include a test developer 134 and a test executor 136. The test developer 134 is responsible for developing a test suite including one or more testing routines, based on the metadata associated with the commit request and information related to all microservices. The test executor 136 places a call to the testing subsystem 106 and to the runtime environment 130, to execute the E2E testing routines using the test suite.

The testing subsystem 106 runs a centralized application which executes the testing routines using the runtime environment 130 and outputs results. For example, the results may be formatted into a desired form and output on a dashboard 138. For example, the dashboard 138 may output graphs showing trends on the stability of a codebase, a breaking change analysis, failure reports, overall stability of test suites, etc.

Also, the testing subsystem 106 generates and provides notification(s) to the commit requesters who submitted the requests to commit the code.

In some embodiments, the testing subsystem 106 is a LINUX®-based system, for example, an open VisaNet (OVN).

The testing subsystem 106 may include a REST API 139 which receives the call from the test executor 136 to start execution of the testing routines and creates a test execution ID for a test request. With respect to the call, the REST API 139 may receive various information from the automation server 104. The information may include, for example, information from the branch name/profile DB 126, information on the commit requester who submitted the commit request, information on the commit request, etc.

Figure 4:
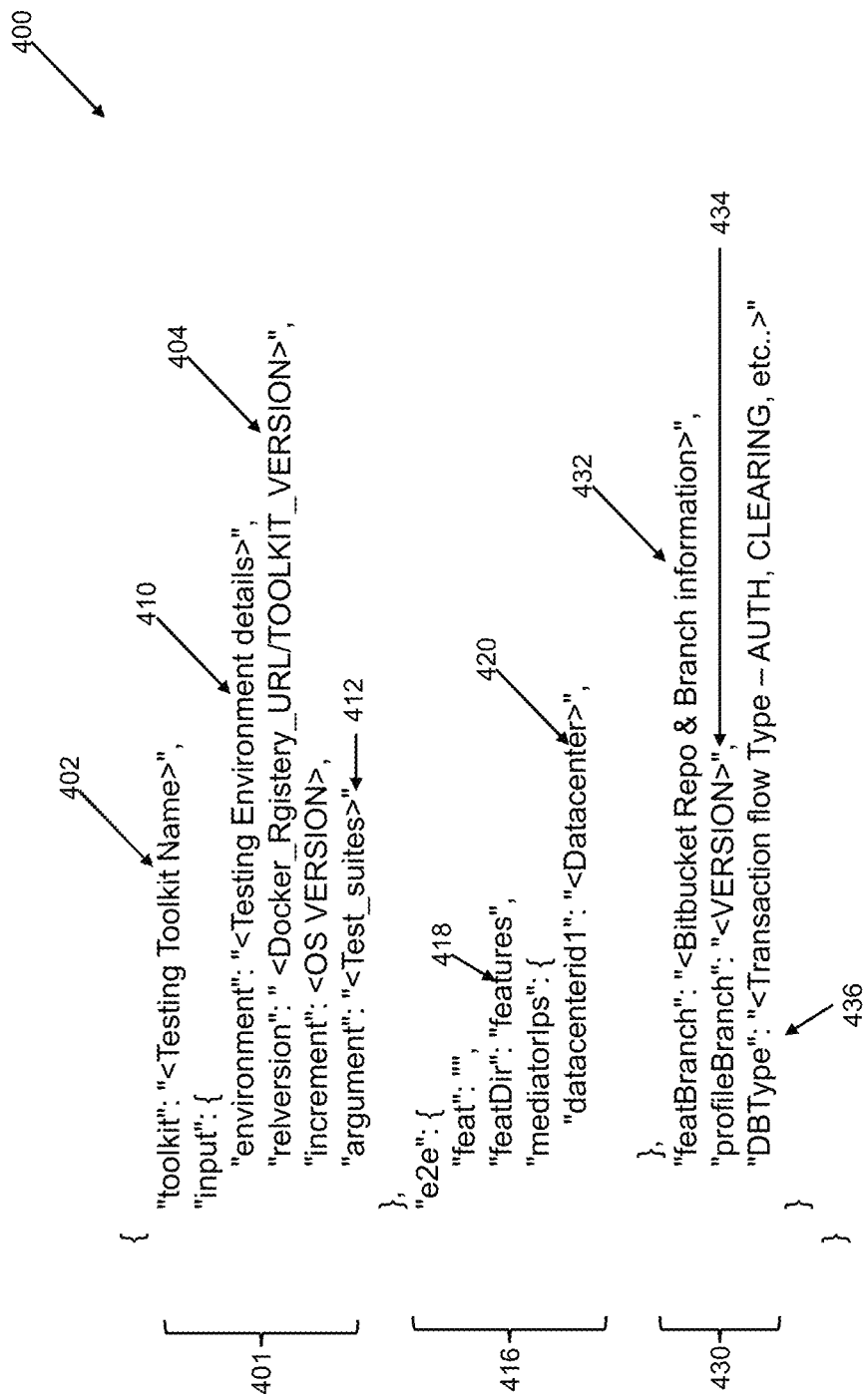
FIG. 4 depicts an example of a payload provided to REST API according to an embodiment.

An example of a payload 400 for the REST API 139 is depicted in FIG. 4. The payload may include information 401 related to the testing tools and the testing platform. For example, the testing subsystem 106, e.g., OVN, includes various toolkits, and the payload 400 may include information 402 indicating which toolkit is to be used and information 404 indicating the version of the toolkit to be used. For example, the toolkit may be capable of simulating the transactions.

The payload 400 may further include information 410 related to the testing subsystem 106 (e.g., OVN) and information 412 related to the test suite. Information related to the test suite includes information indicating which test or tests are to be executed with respect to one or more use cases, depending on the maturity of the code. For example, the information 412 related to the test suite may indicate to run a smoke test on P0 flow use cases to verify connections, a short regressions test (SRG) on P1 flow use cases to detect major defects, and/or a large regressions test (LRG) on P2 and/or P3 flow use cases to detect major and/or minor defects.

The payload 400 may further include information 416 related to the details of E2E test. For example, the payload 400 includes information 418 related to the features to be tested and information 420 related to the runtime environment 130 ("datacenter").

The payload 400 may further include information 430 related to the commit request. For example, the payload 400 includes information 432 related to the data obtained from the code repository 124 ("BitBucket") and the branch information obtained from the branch name/profile DB 126, information 434 indicating a branch version for the code associated with the commit request, and information 436 related to a database containing data with which the test suite is to be executed for a type of transaction flow to simulate, e.g., transaction authorization, clearing settlement, etc.

With reference again to FIG. 1A, the testing subsystem 106 uses the REST API 139 to create a workflow, schedule jobs, spin up a scalable environment (e.g., the runtime environment 130) where the toolkit can be deployed, and execute the test suite using the toolkit. For example, the toolkit has the code to run a financial transaction or simulate a financial transaction. When the test suite is completed, the testing subsystem 106 persists the test execution data which then is further passed through the generation of the reporting which is stored. Once all of the details are stored, this information may be used to send out a notification, e.g., through an email communication, based on the commit requester who submitted the commit request. For example, if the tests were executed for the commit requests submitted within a time period, e.g., 10 commit requests from 10 requesters, the notifications are sent out with respect to each commit request to each of the requesters notifying the requesters whether their codes (e.g., code portions) passed the tests or whether there was a failure caused by their codes and the details of each failing component.

In some embodiments, the testing subsystem 106 may include a scheduler 140 which schedules the test routines, e.g., jobs for the test execution ID, which are queued in a command queue 142. Workers 146 receive the jobs from the command queue 142 and execute the jobs using the application under the test (reference numeral 148) in the runtime environment 130. The REST API 139 may cancel the jobs by using a cancellation queue 150.

The workers 146 store test execution data corresponding to the jobs executions according to the test execution ID in a data store 152. The data is updated until all jobs are completed.

The testing subsystem 106 may further include a results generator 154 which may receive the test execution data corresponding to the jobs executions and may generate reports, notifications, etc. The reports and notifications may be sent to the dashboard 138. Also, the notifications may be sent to the commit requester and/or the code developer computer which initiated the commit requests of the code that was under test or to any designated location or individual.

The workers 146 may also persist all of the details concerning the test execution data corresponding to the jobs executions according to the test execution ID into a persistent volume 160 which outputs the data to the cognitive analysis subsystem 108.

The test execution data corresponding to the jobs executions may include information on which data was used for the testing, information on the endpoint which was used, information on the commit requester who submitted the request to commit the code with the change, information on whether and where the error has occurred, information on test execution status, etc.

As described above, after the completion of the pre-merge test, the testing subsystem 106 may send email notification(s) to the code owner and/or also provide the results of the testing to the designated teams or individuals. The merge of the code is allowed only when the test results of the generated test suite are clean (with only known failures, or no new issues). Flaky tests are ignored in this decision making. For example, the testing subsystem 106 may, as a result of a predetermined successful completion of the test suite (e.g., no predetermined errors detected), automatically merge the code to the code repository, for example, the code repository 124.

In some embodiments, a logic may be implemented where if at least one test routine fails to produce the same result a predetermined number of times, the test may be determined to be flaky. For example, if the test routine eventually passes after the predetermined number of times, it is determined to be flaky. If the test is determined to be flaky, the result is ignored and reported to the dashboard 132 and the overall process may be repeated with the fixes applied with respect to the flaky test, as described below.

In some embodiments, a retry logic may be built in. For example, if the test suite is not completed after three tries, then a notification may be provided that the testing itself has an error.

The cognitive analysis subsystem 108 executes routines based on an AI/ML algorithms built to leverage the test execution details, the report details, the failure details, and, using the AI/ML analysis, determines why a failure has happened and predicts a potential fix in some instances. For example, the cognitive analysis subsystem 108 uses one or more neural network models.

The cognitive analysis subsystem 108 may receive the information on the commit requests from the automation server 104, analyze the received information, and provide an input to the automation server 104 with respect to the generation of the customized testing routines. The cognitive analysis subsystem 108 may also receive, from the testing subsystem 106, information related to the execution of the testing routines, e.g., the test execution data, and analyze the test results. The results of the analysis of the test results may be provided to the dashboard 138.

The cognitive analysis subsystem 108 may include a commit change/use relationship analyzer 170 which receives the information on the commit request from the automation server 104, and uses AI model to analyze the changes which are to be brought about by the code associated with the commit request, with respect to the relationship data, to recommend specific tests to the test developer 134. The relationship data may be the data related to what change the code may introduce to which use cases and which microservices can be affected. For example, an output of the AI model is a recommendation of a high impact test suite which may uncover issues and prevent breaking. The recommendation may be provided to the test developer 134 so that the test developer 134 may develop highly applicable customized test routines to be included in the test suite for testing the code associated with the given commit request.

The cognitive analysis subsystem 108 may further include a test data storage 172 into which the persistent volume 160 persists the test execution data. The test execution data may be further stored in a cognitive analysis (CA) memory 173.

The cognitive analysis subsystem 108 may further include a results analyzer 174 and a flaky tests determiner 176. One or all of the results analyzer 174 and the flaky tests determiner 176 may be implemented with AI/ML algorithms.

The results analyzer 174 analyzes the test execution data provided by the persistent volume 160. For example, the results analyzer 174 analyzes failure and/or success of the tests or the test routines executed by the test suite and stores the results in the CA memory 173.

The flaky tests determiner 176 analyzes the quality of tests automation scripts to plot trends of the test automation script stability or flakiness.

In some embodiments, based on the results of the analysis performed by the results analyzer 174 and/or the flaky tests determiner 176, the notification of the unstable and/or the flaky test may be submitted to the dashboard 132, so that the user can review the results and determine whether the tests on the commit request need to be redesigned and repeated. In some embodiments, the cognitive analysis subsystem 108 may recommend a fix for the unstable and/or the flaky test which may be utilized by the test developer 134.

Figure 2A:
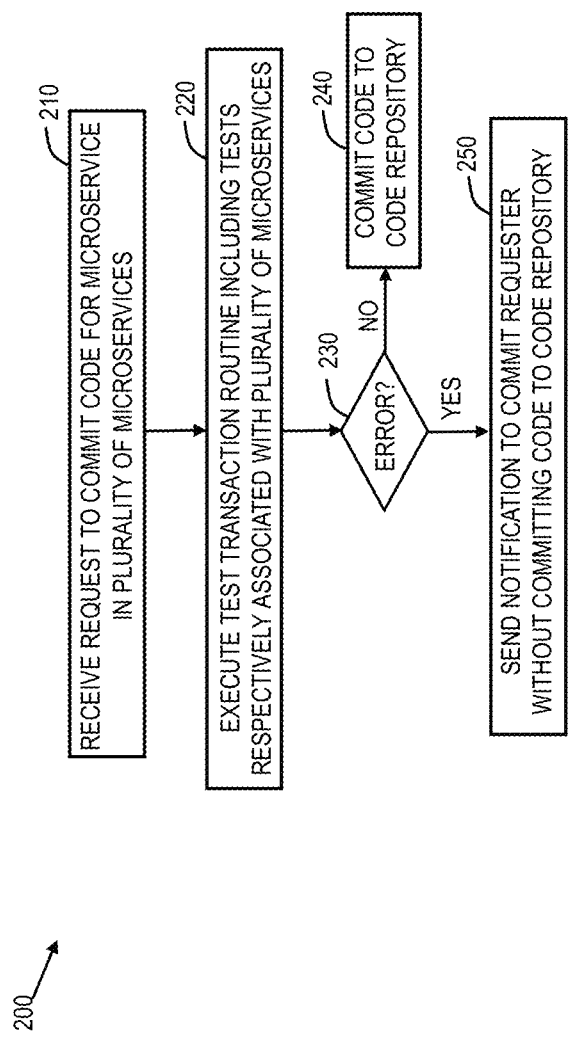
FIG. 2A depicts a method according to an embodiment.

FIG. 2A depicts a method 200 according to an embodiment. The method 200 may be performed by the testing system 100. For example, the method 200 may be performed by some or all of the CI subsystem 102, the automation server 104, the testing subsystem 106, and the runtime environment 130.

The processing of the method 200 depicted in FIG. 2A may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 2A and described below is intended to be illustrative and non-limiting. Although FIG. 2A depicts the various processing operations occurring in a particular sequence or order, this is not intended to be limiting. In certain alternative embodiments, the method 200 may be performed in some different order or some operations may be performed in parallel.

With continuing reference to FIG. 2A, in operation 210, a commit request, e.g., a request to commit a code or a code portion, may be received in the code repository 124. The commit request may be received from one of a plurality of code developer computers and may be a request to commit a code developed for one of the plurality of microservices by one of the commit requesters who is associated with one of the plurality of code developer computers.

In operation 220, a test transaction routine including tests respectively associated with the plurality of microservices may be executed.

In operation 230, it is determined whether one or more errors have occurred in the execution of the test transaction routine.

If it is determined that no error has occurred in the execution of the test transaction routine (NO in operation 230), the code is determined to be ready to be committed to the code repository, e.g., merged into a particular branch (Operation 240).

If it is determined that one or more errors have occurred in the execution of the test transaction routine (YES in operation 230), the notification of the error is sent to the commit requester who submitted the commit request without the code being committed to the code repository (Operation 250).

Figure 2B:
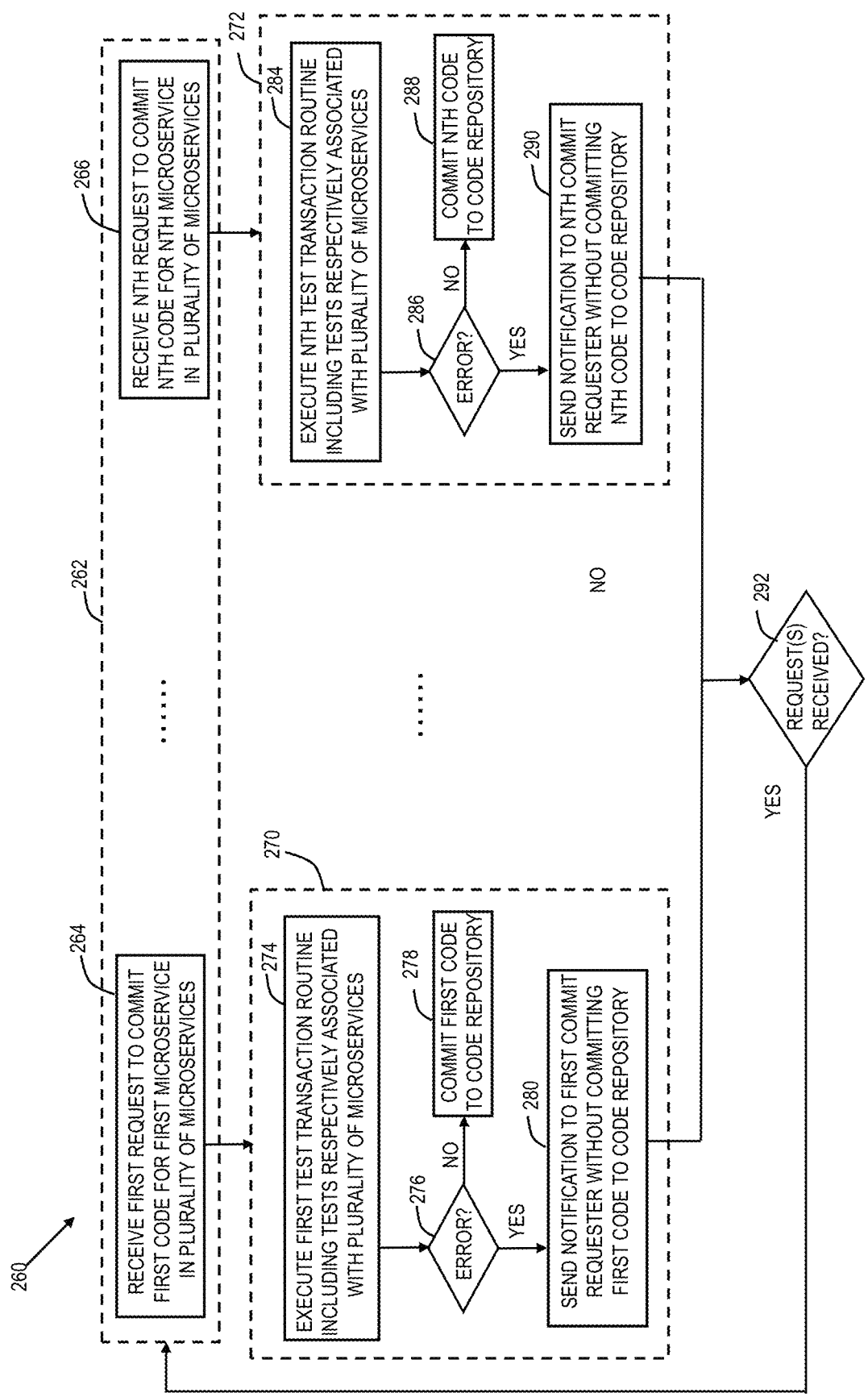
FIG. 2B depicts a method according to an embodiment.

FIG. 2B depicts a method 260 according to an embodiment. The method 260 may be performed by the testing system 100. For example, the method 260 may be performed by some or all of the CI subsystem 102, the automation server 104, the testing subsystem 106, and the runtime environment 130.

The processing of the method 260 depicted in FIG. 2B may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 2B and described below is intended to be illustrative and non-limiting. Although FIG. 2B depicts the various processing operations occurring in a particular sequence or order, this is not intended to be limiting. In certain alternative embodiments, the method 260 may be performed in some different order or some operations may be performed in parallel.

In some embodiments, the processing of the method 260 may be performed for the receipt of a plurality of requests for merging or committing a plurality of code portions that are respectively received from a plurality of code developer computers 304 during a predetermined time period and are for the plurality of microservices. For example, the automation server 104 may generate a plurality of test transaction routines, e.g., a plurality of test suites, associated with the plurality of microservices which may be run by using a plurality of runtime environments, respectively. For example, the CI subsystem 102 may build a plurality of runtime environments by compiling an appropriate code, e.g., generating code versions or binary versions, where each of the code versions includes the source code into which a respective code portion of the plurality of code portions is incorporated. The testing subsystem 106 may execute the plurality of test transaction routines in parallel using the plurality of runtime environments.

With continuing reference to FIG. 2B, in operation 262, a plurality of commit requests, e.g., requests to commit code portions, may be received in the code repository 124. In an example of FIG. 2B, the requests to commit the code portions may include a first request to commit a first code for a first microservice to an Nth request to commit an Nth code for an Nth microservice that are respectively received in operations 264 to 266. The commit requests may be received from a plurality of code developer computers and may be requests to commit code portions developed for the plurality of microservices by the commit requesters associated with the plurality of code developer computers.

In the method 260, a first processing 270 to an Nth processing 272 may be executed in parallel for each of the received commit requests.

The first processing 270 may include an execution of a first test transaction routine including tests which are respectively associated with the plurality of microservices and are for the first code (Operation 274).

The first processing 270 may include operation 276 where it is determined whether one or more errors have occurred in the execution of the first test transaction routine.

If it is determined that no error has occurred in the execution of the first test transaction routine (NO in operation 276), the first code is determined to be ready to be committed to the code repository, e.g., merged into a particular branch (Operation 278).

If it is determined that one or more errors have occurred in the execution of the first test transaction routine (YES in operation 276), the notification of the error is sent to the first commit requester who submitted the first request without the first code being committed to the code repository (Operation 280).

The Nth processing 272 may include an execution of an Nth test transaction routine including tests which are respectively associated with the plurality of microservices and are for the Nth code (Operation 284).

The Nth processing 272 may include operation 286 where it is determined whether one or more errors have occurred in the execution of the Nth test transaction routine.

If it is determined that no error has occurred in the execution of the Nth test transaction routine (NO in operation 286), the Nth code is determined to be ready to be committed to the code repository, e.g., merged into a particular branch (Operation 288).

If it is determined that one or more errors have occurred in the execution of the Nth test transaction routine (YES in operation 286), the notification of the error is sent to the Nth commit requester who submitted the Nth request without the Nth code being committed to the code repository (Operation 290).

In operation 292, it may be determined if one or more commit requests are received. In this case, the method 260 proceeds to operation 262 where one or more commit requests may be processed as described above.

As described above, in the continuous testing, a plurality of requests for merging or committing a plurality of code portions, which are for the plurality of microservices, may be respectively received from a plurality of code developer computers 304 on a continuous basis, e.g., the plurality of requests may be received successively or in parallel, anytime every day of the week. A plurality of test transaction routines associated with the plurality of microservices may be executed in parallel by using code versions, where each of the code versions includes the source code into which a respective code portion of the plurality of code portions is incorporated. If one or more errors occurred in response to the executing one or more of the plurality of test transaction routines, one or more code portions associated with those test transaction routines which uncovered the error(s), are not allowed to merge to the code repository 124. If no error occurred in response to the executing the plurality of test transaction routines, the code portion or the code portions associated with the errorless results are merged to the code repository 124.

FIG. 3 depicts a computing environment 300 according to an embodiment.

As shown in FIG. 3, at least some of the components of the testing system 100 may be a part of a cloud infrastructure 302 provided by a cloud service provider (CSP) which provides one or more cloud services to one or more code developer computers 304, e.g., one or more of a first code developer computer 312, a second code developer computer 314, . . . an Nth code developer computer 316. For example, the cloud infrastructure 302 may include the testing subsystem 106, the runtime environment 130, the cognitive analysis subsystem 108, and the code repository 124. The cloud infrastructure 302 depicted in FIG. 3 is merely an example and is not intended to unduly limit the scope of embodiments. Many variations, alternatives, and modifications are possible. For example, in some implementations, the cloud infrastructure 302 may have more or fewer subsystems or components than those shown in FIG. 3, may combine two or more subsystems, may have a different configuration or arrangement of subsystems, or may be incorporated by different cloud infrastructures coupled to each other.

The cloud infrastructure 302 may be connected, via a communication network 320 and a bus 330, to the code developer computers 304 and a processor 340. For example, the processor 340 may correspond to the CI subsystem 102 and the automation server 104. However, this is not intended to be limiting and each of the CI subsystem 102 and the automation server 104 may be implemented by a separate processor as discussed above with reference to FIG. 1A.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted as prior art.

What is claimed is:

1. A method for performing a continuous testing, the method comprising:
   receiving, by at least one processor from a code developer computer among a plurality of code developer computers, a request to commit a code portion for a microservice among a plurality of microservices, to a code repository comprising a source code for the plurality of microservices;
   executing, by the at least one processor using the source code into which the code portion is incorporated, a test transaction routine comprising tests respectively associated with the plurality of microservices;
   determining, by the at least one processor, if one or more errors occurred in response to the executing the test transaction routine; and
   in response to the determining, performing, by the at least one processor, an action comprising:
      if no errors occurred, then committing the code portion to the code repository, or
      if one or more errors occurred, then sending a notification to the code developer computer regarding the one or more errors without committing the code portion to the code repository,
   wherein the request to commit the code portion is one of a plurality of requests to commit a plurality of code portions that are respectively received from the plurality of code developer computers during a predetermined time period and are for the plurality of microservices, and
   wherein the test transaction routine is one of a plurality of test transaction routines which are associated with the plurality of microservices and executed by the at least one processor in parallel by using code versions, each of the code versions comprising the source code into which a respective code portion of the plurality of code portions is incorporated.

2. The method of claim 1, wherein the code repository includes the source code for only the plurality of microservices.

3. The method of claim 1, wherein the test transaction routine generates a pseudo message that is processed by the plurality of microservices.

4. The method of claim 1, wherein the plurality of microservices are run by a plurality of virtual machines.

5. The method of claim 1, further comprising:
   creating a sandbox test environment to test the source code into which the code portion is incorporated, with respect to the plurality of microservices.

6. The method of claim 1, wherein:
   the determining further comprises determining if one or more errors occurred in response to the executing the plurality of test transaction routines, respectively, and
   the performing further comprises performing the action in response to a result of the determining, for each of the plurality of code portions.

7. The method of claim 1, wherein the plurality of microservices perform a plurality of operations on a message.

8. The method of claim 7, wherein the plurality of operations include at least two operations from among fraud detection, tokenization, and cryptographic processing.

9. The method of claim 1, further comprising:
   determining, by the at least one processor, the test transaction routine using a neural network.

10. A system comprising:
    a code repository comprising a source code for a plurality of microservices; and
    one or more computer systems, wherein the one or more computer systems are configured to perform a method including:
    receiving, from a code developer computer among a plurality of code developer computers, a request to commit, to the code repository, a code portion for a microservice among the plurality of microservices;

executing, using the source code into which the code portion is incorporated, a test transaction routine comprising tests respectively associated with the plurality of microservices;

determining if one or more errors occurred in response to the executing the test transaction routine; and in response to the determining, performing an action including:

if no errors occurred, then committing the code portion to the code repository, or if one or more errors occurred, then sending a notification to the code developer computer regarding the one or more errors without committing the code portion to the code repository, wherein the request to commit the code portion is one of a plurality of requests to commit a plurality of code portions that are respectively received from the plurality of code developer computers during a predetermined time period and are for the plurality of microservices, and wherein the test transaction routine is one of a plurality of test transaction routines which are associated with the plurality of microservices and executed in parallel by using code versions, each of the code versions comprising the source code into which a respective code portion of the plurality of code portions is incorporated.

11. The system of claim 10, wherein the code repository comprises the source code for only the plurality of microservices.

12. The system of claim 10, wherein the test transaction routine generates a pseudo message that is processed by the plurality of microservices.

13. The system of claim 10, wherein the plurality of microservices are run by a plurality of virtual machines.

14. The system of claim 10, wherein the method further includes:

creating a sandbox test environment to test the source code into which the code portion is incorporated, with respect to the plurality of microservices.

15. The system of claim 10, wherein:

the determining further includes determining if one or more errors occurred in response to the executing the plurality of test transaction routines, respectively, and the performing further includes performing the action in response to a result of the determining, for each of the plurality of code portions.

16. The system of claim 10, wherein the plurality of microservices perform a plurality of operations on a message.

17. The system of claim 16, wherein the plurality of operations include at least two operations from among fraud detection, tokenization, and cryptographic processing.

18. The system of claim 10, wherein the method further includes:

determining the test transaction routine using a neural network.

\* \* \* \* \*